United States Patent
Walters et al.

(10) Patent No.: US 9,587,734 B2
(45) Date of Patent: Mar. 7, 2017

(54) OPERATOR CONTROL ELEMENT

(71) Applicant: Dr. Ing. h.c. F. Porsche Aktiengesellschaft, Stuttgart (DE)

(72) Inventors: Markus Walters, Stuttgart (DE); Guerol Guendogan, Kirchberg/Murr (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 14/027,735

(22) Filed: Sep. 16, 2013

(65) Prior Publication Data
US 2014/0076085 A1 Mar. 20, 2014

(30) Foreign Application Priority Data
Sep. 18, 2012 (DE) .................. 10 2012 108 736

(51) Int. Cl.
*B60K 20/00* (2006.01)
*F16H 59/10* (2006.01)
*F16H 59/08* (2006.01)

(52) U.S. Cl.
CPC .......... *F16H 59/105* (2013.01); *F16H 59/08* (2013.01); *F16H 2059/081* (2013.01); *Y10T 74/2014* (2015.01)

(58) Field of Classification Search
CPC .... F16H 59/10; F16H 59/12; F16H 2059/081; Y10T 74/2014
USPC .............................. 74/473.21, 473.25, 473.3
See application file for complete search history.

(56) References Cited

U.S. PATENT DOCUMENTS

| | | | | |
|---|---|---|---|---|
| 5,884,528 A * | 3/1999 | Ludanek et al. | ............. | 74/473.3 |
| 7,971,498 B2 * | 7/2011 | Meyer et al. | ................ | 74/10.41 |
| 2002/0152827 A1 * | 10/2002 | Hayashi et al. | ............. | 74/473.3 |
| 2003/0029261 A1 * | 2/2003 | DeJonge | ........................ | 74/335 |
| 2006/0037424 A1 * | 2/2006 | Pickering et al. | ........... | 74/473.3 |
| 2007/0261509 A1 * | 11/2007 | Meyer et al. | ................... | 74/504 |
| 2009/0000413 A1 * | 1/2009 | Furhoff et al. | ............... | 74/473.3 |
| 2011/0219901 A1 * | 9/2011 | Giefer et al. | ................ | 74/473.3 |
| 2014/0007726 A1 * | 1/2014 | Muraki et al. | ............... | 74/473.3 |
| 2014/0345409 A1 * | 11/2014 | Watanabe | ................... | 74/473.3 |

* cited by examiner

Primary Examiner — William Kelleher
Assistant Examiner — Zakaria Elahmadi
(74) Attorney, Agent, or Firm — RatnerPrestia

(57) ABSTRACT

An operator control element (1) for selecting and setting a driving mode of the vehicle, wherein a rotational element (2) on the steering wheel of the vehicle is provided with a sensing element (3) which detects the rotation of the rotational element (2) and the stationary position of the rotational element, wherein the rotation of the rotational element can be sensed by counting the rotational steps, wherein a position and sequence of the rotational steps is assigned to each selectable driving mode, with the result that the driving modes are selected by rotating the rotational element to a stationary position and by counting the rotational steps when the rotational direction is detected.

1 Claim, 1 Drawing Sheet

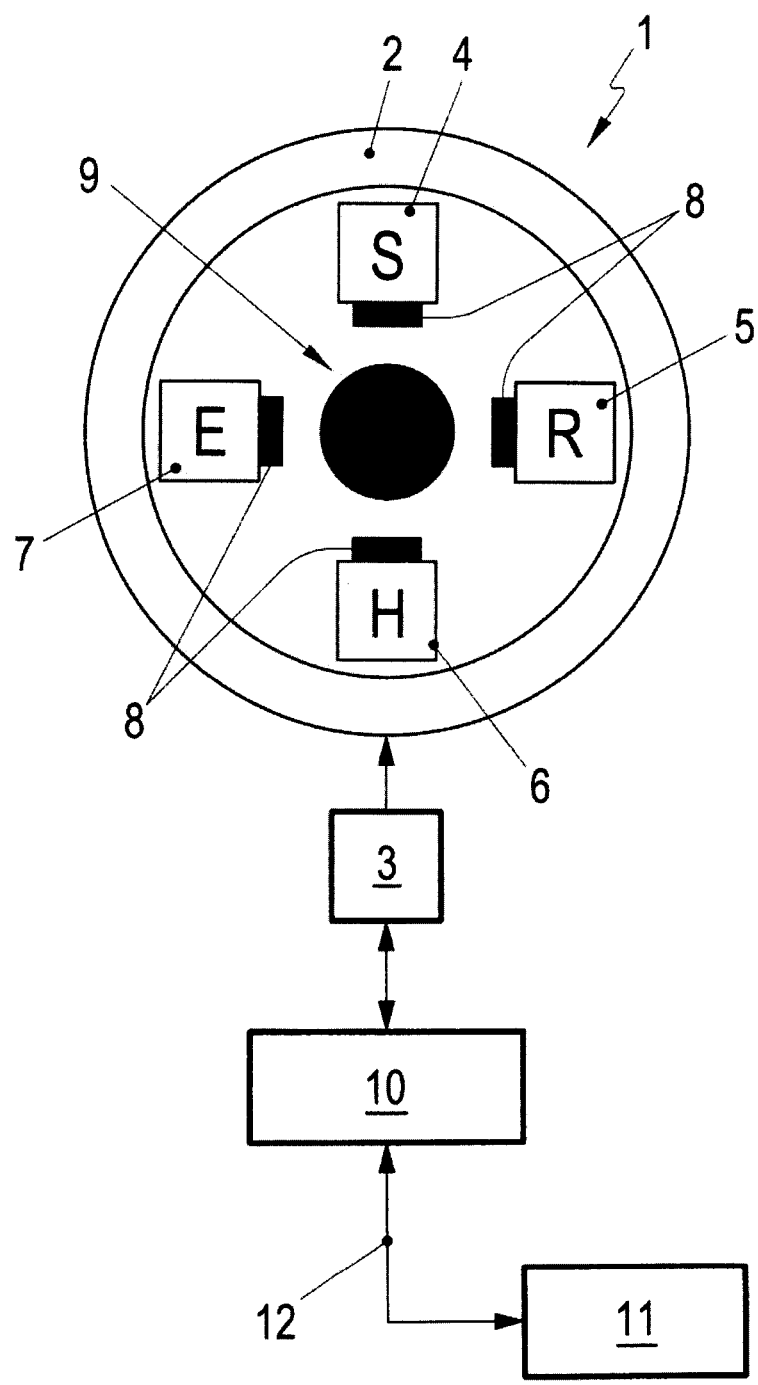

OPERATOR CONTROL ELEMENT

CROSS-REFERENCE TO RELATED APPLICATIONS

This application claims priority of German Patent Application No. 10 2012 108 736.9, filed Sep. 18, 2012, which is incorporated by reference herein in its entirety.

FIELD OF INVENTION

The invention relates to an operator control element, in particular of a motor vehicle.

BACKGROUND

When setting driving positions in motor vehicles, use is generally made of a selector lever in the region of the centre tunnel, by means of which lever the respective driving position is moved into the corresponding position by tipping the selector lever.

Selector levers are also known on the dashboard, in the region of the steering wheel axle, and they also permit the driving position to be selected by adjusting the selector lever.

In this context, the selector levers are usually connected mechanically to a valve actuator in order to be able to set the driving position hydraulically in the transmission.

This cannot be used in modern vehicles, such as, for example, in hybrid vehicles or electric vehicles in which, at least temporarily, it is possible to drive electrically, because a hydraulically actuable transmission is required in such vehicles. However, even in vehicles with an internal combustion engine, the possibility of selector levers as an operator control element is very expensive and inflexible.

SUMMARY

Therefore, the object of the present invention is to provide an operator control element which is of simple design but which can nevertheless be used easily and safely.

The object is achieved with an operator control element (1) for selecting and setting a driving mode of the vehicle, wherein a rotational element (2) on the steering wheel of the vehicle is provided with a sensing element (3) which detects the rotation of the rotational element (2) and the stationary position of the rotational element, wherein the rotation of the rotational element can be sensed by counting the rotational steps, wherein a position and sequence of the rotational steps is assigned to each selectable driving mode, with the result that the driving modes can be selected by rotating the rotational element to a stationary position and by counting the rotational steps when the rotational direction is detected.

An exemplary embodiment of the invention relates to an operator control element for selecting and setting a driving mode of the vehicle, in particular the drive of the vehicle, wherein a rotational element which can be rotated infinitely on the steering wheel of the vehicle is provided with a sensing element which detects the rotation of the rotational element and the stationary position of the rotational element, wherein the rotation of the rotational element can be carried out by counting the rotational steps, wherein each selectable driving mode is assigned a position in the sequence of the rotational steps, such that the driving modes are selected by rotating the rotational element to a stationary position and by counting the rotational steps when the rotational direction is detected.

In this context it is advantageous if each selectable driving mode is assigned a display which can be activated when the corresponding driving mode is selected. An illuminated field can be provided as the display, which illuminated field also displays the selected driving mode by means of lettering. For example a light emitting diode (LED) can be used for the illumination.

It is advantageous here if various driving modes can be selected, wherein in each case a display is provided for each driving mode which are each arranged rotated by the same angular value with respect to one another. In the case of four driving modes this would accordingly be an offset of 90° in each case. As a result, a simple arrangement can be found, wherein the driver can also detect the selected driving mode from the position of the display.

Furthermore, it is expedient if the rotational element is a rotational ring, wherein an activation knob is provided in the centre of the rotational ring. The activation knob can be assigned a separate function.

In this context, it is also expedient if the displays are arranged radially inside the rotational ring. As a result, a central arrangement of the displays and also a compact design are obtained.

It is particularly advantageous if the displays of the driving modes are arranged at a 12 o'clock, 3 o'clock, 6 o'clock and 9 o'clock position. As a result, in particular the driver can easily detect the selected driving mode from the activated display, even, under certain circumstances, with a rapid glance.

It is particularly expedient if an evaluation electronic system is provided which determines the rotational direction and the number of rotational steps and/or, under certain circumstances, determines the selected driving mode and passes it on to a further electronic unit by data signal. As a result, the detected rotation and stationary position are passed onto at least one other electronic unit for further processing of the data.

It is expedient if the rotational direction and the rotational steps are output via a data bus, preferably by means of a LIN bus or CAN bus.

It is also advantageous if the selected driving mode is output by data bus.

It is advantageous if the rotation of the rotational element or of the rotational ring is latched with a predefined rotational step increment. This results in advantageous haptics of the rotational element.

It is also expedient if the latching corresponds to an even number N of steps for 90° rotation, preferably 4, 5 or 6 steps for 90° rotation.

It is advantageous if a changeover to another driving mode takes place after a number X of rotational steps, wherein: X=1, 2, 3, 4, 5, . . . or X=N.

In the text which follows, the invention will be explained in detail by means of an exemplary embodiment and with reference to the drawing, in which:

BRIEF DESCRIPTION OF THE DRAWINGS

FIG. 1 shows a schematic illustration of an operator control element according to the invention.

DETAILED DESCRIPTION

FIG. 1 shows a schematic illustration of an operator control element 1 for selecting and setting a driving mode, in particular of a vehicle, in particular the driver of the vehicle wherein the operator control element 1 is preferably arranged on a steering wheel of the vehicle.

The operator control element 1 has a rotational element 2 which can rotate infinitely and which can be rotated infinitely both in the clockwise direction and in the counter clockwise direction. Furthermore, a sensing element 3 is provided which detects the rotation of the rotational element 2 and the stationary position of the rotational element 2. In this context, the rotation of the rotational element 2 can be carried out by counting rotational steps, wherein each selectable driving mode is assigned a position in the sequence of the rotational steps, with the result that the driving modes take place by rotating the rotational element 2 to a stationary position which corresponds to a driving mode, wherein, furthermore, the counting of the rotational steps takes place when the rotational direction of the rotational element is also detected.

Furthermore, displays 4, 5, 6, 7 are provided by means of which the respectively selected driving mode is displayed. In this context, the displays 4, 5, 6, 7 can be illuminated by means of a lighting means 8, with the result that by illuminating the display 4, 5, 6, 7 it is possible to signal that a corresponding driving mode is activated.

In the exemplary embodiment in FIG. 1, the driving modes are denoted by S, R, H and E, wherein the mode E is used for an "e-drive" driving mode, wherein the term H is used for a "hybrid mode", the term S is used for a "sport hybrid mode", and R is used for the "race hybrid mode". After the ignition is switched on, the driving mode is respectively set to the driving mode E with the terminal 15, with the result that a changed drive can be set manually after the ignition has been switched on. In this context, the driving states are supplied to terminal 15=1, that is to say after the ignition is switched on, by a steering wheel electronic system.

In the exemplary embodiment in FIG. 1, the rotational element 2 is embodied as a rotational ring, wherein the displays 4, 5, 6, 7 are arranged radially inside the rotational ring. A further activation signal 9 is provided in the central region of the rotational ring, which activation element 9 is embodied as an activation knob, with the result that by pressing the activation element or knob 9 a specific driving state, such as, for example, an acceleration mode or boost mode, can be activated.

As is apparent from FIG. 1, the displays of the driving modes are each arranged at 12 o'clock, 3 o'clock, 6 o'clock and 9 o'clock, with the result that they are substantially in the shape of a cross and an angle of approximately 90° with respect to one another is present.

The evaluation electronics system 10 which is also provided evaluates the number of rotational steps and the rotational direction in order to determine the selected driving mode and to pass it on per data signal to a further electronic unit 11. The further electronic unit 11 can be, for example, a steering wheel electronics. In this context, the data transfer of the data signals may be performed, for example, by a data bus 12, such as, for example, by a LIN bus or CAN bus. In this context, the data transmitted can either pass on driving modes already evaluated by the control unit 10 or the rotational direction and the rotational steps and, if appropriate, the stationary position, with the result that the further electronics unit 11 determines the driving mode to be set on the basis of the transfer data itself and then sends back a signal for the control unit 10 in order to actuate the illumination of the display 4, 5, 6, 7 which is assigned to the selected driving state.

It is particularly advantageous if the rotation of the rotational element 2 is latched by means of predefined step increments, wherein it is advantageous if a rotation through 90° takes place in N steps, wherein N is preferably 4, 5 or 6, which means that four rotational steps, 5 or 6 rotational steps are used in order to rotate the rotational element 2 through 90°. It is also advantageous if there is a changeover to another driving mode when a number X of rotational steps occurs where X=1 or can be more or else X=N.

It is particularly advantageous if a signal is output in the event of a crash, that is to say in a detected accident situation, after which the operator control of the operator control element 1 is prohibited by means of the control unit 10, wherein a signal, which is evaluated, can be made available via the data bus 12. In this crash, the control unit 10 receives a signal, with the result that further activation of the rotational element 2 does not lead to further selection of a driving mode.

What is claimed:

1. An operator control element (1) for selecting and setting a driving mode of the vehicle, wherein a rotational element (2) on the steering wheel of the vehicle, which rotational element can rotate infinitely and which can be rotated infinitely both in the clockwise direction and in the counter clockwise direction, is provided with a sensing element (3) which detects the rotation of the rotational element (2) and the stationary position of the rotational element, wherein the rotation of the rotational element can be sensed by counting the rotational steps, wherein a position and sequence of the rotational steps is assigned to each selectable driving mode, with the result that the driving modes can be selected by rotating the rotational element to a stationary position and by counting the rotational steps when the rotational direction is detected, wherein:
   each selectable driving mode is assigned an LED display (4, 5, 6, 7), which can be activated when the corresponding mode is selected;
   four driving modes can be selected, said driving modes being e-drive mode (E), hybrid mode (H), sport hybrid mode (s), and racing hybrid mode (R), wherein for each mode the display is arranged at a 90° intervals with respect to the adjacent displays, at 12 o'clock, 3 o'clock, 6 o'clock, and 9 o'clock positions, respectively;
   the rotational element (2) is a rotational ring and an activation element (9) for activating an additional acceleration mode or a boost mode is provided in the center of the rotational ring;
   the displays (4, 5, 6, 7) are arranged radially inside the rotational ring;
   evaluation electronics are provided as a control unit (10) that determines the rotational direction and the number of the rotational steps and/or, if appropriate, determines the selected driving mode, and selected drive mode, the rotational direction, and/or the rotation steps are output as data signals via a data bus (12) comprising a LIN bus or a CAN bus to a further electronic unit (11); and
   the rotation of the rotational element (2) or of the rotational ring is latched with a predefined rotational step increment, and the latching corresponds to a number N of steps per 90° of rotation.

* * * * *